T. A. SAMMONS.
Corn-Planter.
No. 209,717. Patented Nov. 5, 1878.
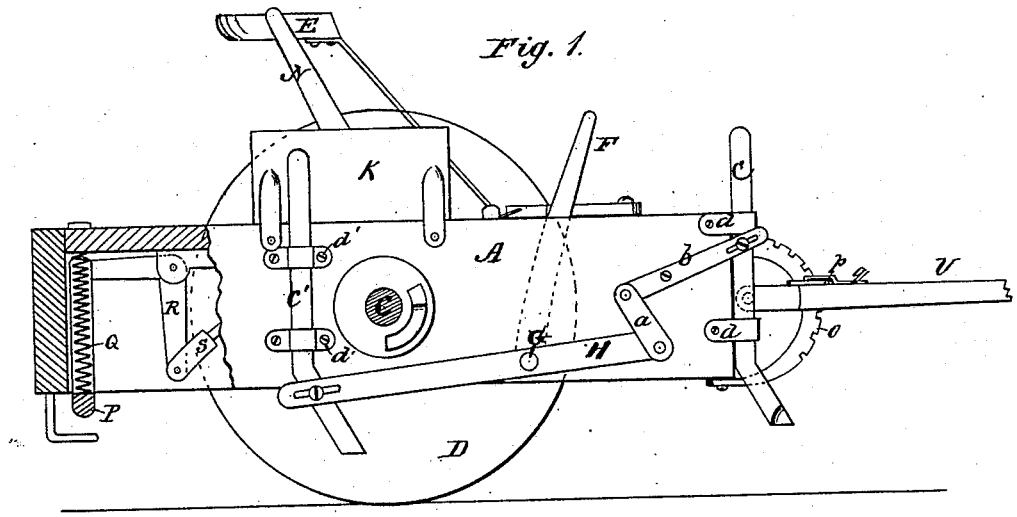
Fig. 1.
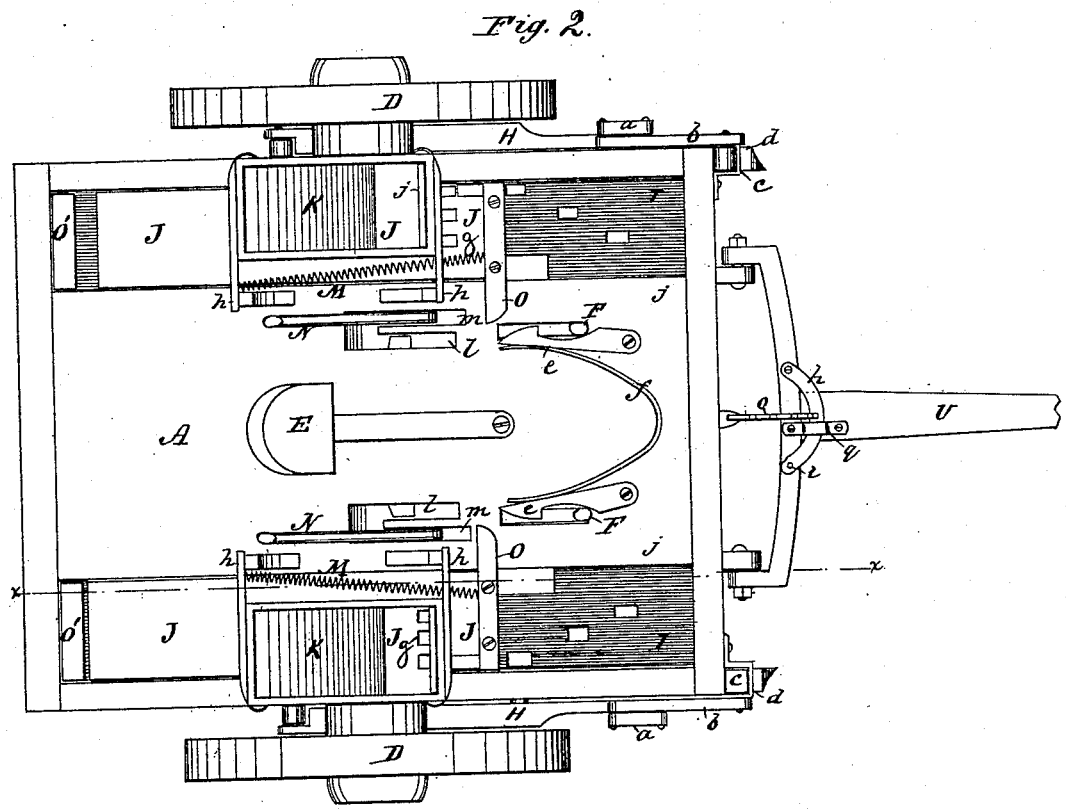
Fig. 2.
WITNESSES:
W. W. Hollingsworth
Edw. W. Byrn
INVENTOR:
Thomas A. Sammons
BY
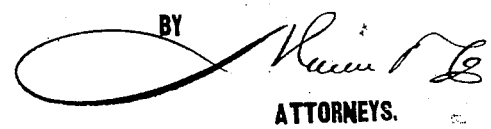
ATTORNEYS.

2 Sheets—Sheet 2.

T. A. SAMMONS.
Corn-Planter.

No. 209,717. Patented Nov. 5, 1878.

WITNESSES:
W. W. Hollingsworth
Edw. W. Byrn

INVENTOR:
Thomas A. Sammons
BY
ATTORNEYS.

UNITED STATES PATENT OFFICE.

THOMAS A. SAMMONS, OF LEWISBURG, WEST VIRGINIA.

IMPROVEMENT IN CORN-PLANTERS.

Specification forming part of Letters Patent No. 209,717, dated November 5, 1878; application filed August 9, 1878.

*To all whom it may concern:*

Be it known that I, THOMAS A. SAMMONS, of Lewisburg, in the county of Greenbrier and State of West Virginia, have invented a new and Improved Corn-Planter; and I do hereby declare that the following is a full, clear, and exact description of the same, reference being had to the accompanying drawing, forming part of this specification, in which—

Figure 3:
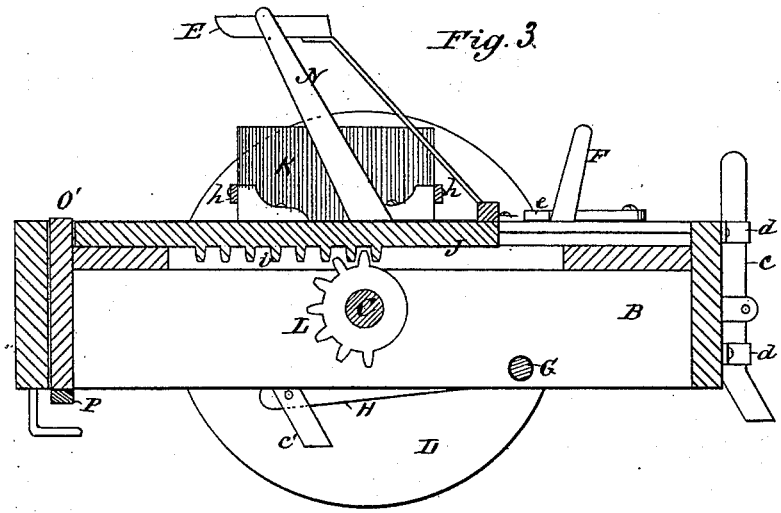
Figure 4:
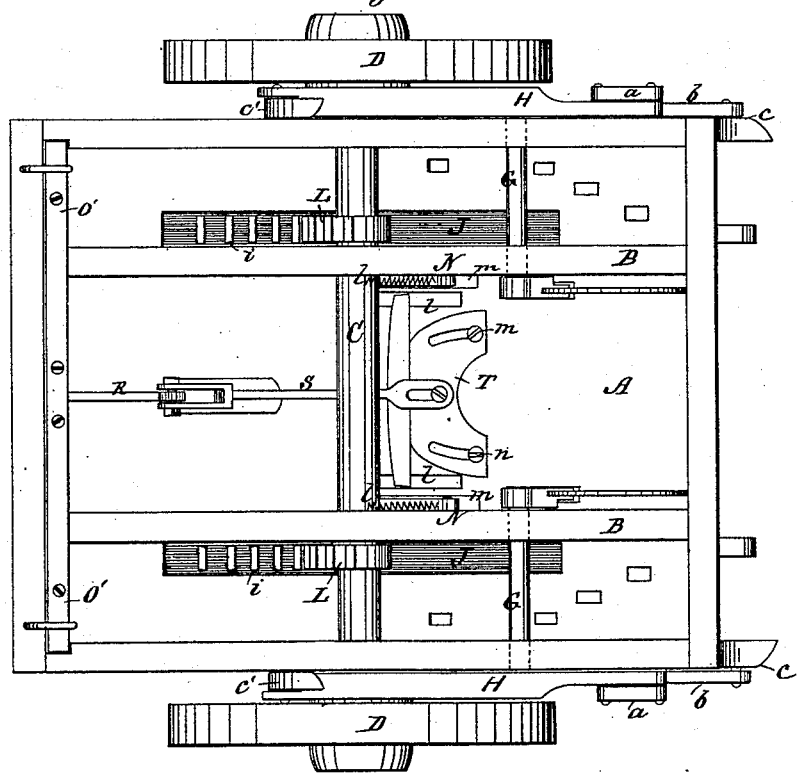

Figure 1 is a side elevation, with the nearest wheel removed and the rear end broken out. Fig. 2 is a plan view, with one of the feed-slides advanced slightly. Fig. 3 is a vertical section through the line $x\ x$ of Fig. 2, and Fig. 4 is an inverted-plan or underneath view.

My invention relates to an improved corn-planter, designed to plant the corn in straight rows both ways and at varying distances apart, the same being constructed upon the general principle of a reciprocating slide, passing alternately beneath a hopper, and carrying a number of grains from beneath the same to a discharge-outlet.

The improvement consists, chiefly, in the following features: First, in the particular means for adjusting the furrow opener and cover simultaneously and by the same movement, so that the shovels constituting the same are either down upon the ground or elevated from the same, as may be desired; secondly, in the particular construction and arrangement of devices for operating the slides, which means consist, mainly, in a segmental pinion on the revolving shaft of the drive-wheels and a rack upon the bottom of the slide, arranged to be engaged by the pinion and reciprocated thereby, in connection with a spring, and yet capable of being thrown longitudinally out of engagement from said pinion; thirdly, in the means for throwing the slides into or out of gear; and, fourthly, in the adjustment of the tongue, all as hereinafter more fully described.

In the drawing, A represents a rectangular frame, having longitudinal bars B in bearings, in which bars is arranged the transverse shaft C, carrying drive-wheels D D. The upper side of the frame A is for the most part a level surface, forming a platform, and upon the same, midway between the wheels, is fixed the driver's seat E. Just in front of the seat, and within easy reach upon both sides, are levers F F. These levers extend downwardly through the platform, and are rigidly attached to rock-shafts G G, journaled in bearings in the longitudinal bars B B. Each of these rock-shafts carries upon its outside end an oscillating lever, H. The forward ends of these oscillating levers are connected, through links $a$, with a second pair of levers, $b$, and the forward ends of these are loosely connected with the standards $c$ of the furrow-opening shovels, which standards slide in guides $d\ d$ in the forward end of the frame-work. The rear ends of the oscillating levers H are loosely connected with the rear standards, $c'$, which slide vertically in guides $d'\ d'$, and carry the shovels for covering the grain in the furrow.

These devices just described are constructed in duplicate—*i. e.,* one set upon each side of the machine for the two sets of dropping devices—and they provide means for simultaneously raising or lowering the furrow-opening and furrow-covering shovels. Thus, when the levers F are pushed forward with the foot the rock-shaft is turned axially, the lever H deflected so that its rear end lifts the coverer-standard, and its forward end lifts the opener-standard through the link $a$ and lever $b$.

For holding the devices to their adjustment, I have shown notched bars $e\ e$, pivoted upon the platform, and held up against the levers by a spring, $f$; but in practice I propose to use, in connection with said levers, the ordinary curved notched bar holding the lever to its adjustment.

For feeding the corn to the furrow, I provide the following arrangement: Upon each side of the machine the platform is constructed with a depressed portion, I, Fig. 2, in which, in undercut grooves or guides, a slide, J, is arranged to reciprocate. These slides are provided with holes $g$, and immediately above the same are placed hoppers K, which are hinged or pivoted at $h$ upon one side, so as to be turned over to give access to the slide, and are fastened down upon the other side by any suitable means. These hoppers are provided each with a brush, which sweeps off the corn from the holes of the slide as the latter passes from beneath the hopper, and this brush is attached to a slide, $j$, made vertically adjustable by a slot and binding-screw, so that as the brush wears out it may be adjusted closer down to the slide. In giving motion to the slide J it is provided upon its under side with a set of cog-teeth, forming a rack, $i$, which projects through a slot in the platform, and is engaged intermittingly by a segmental pinion, L, having teeth upon one side only. This pinion is firmly fixed to the shaft of the drive-wheels, so that as said shaft turns the pinion advances the slide until its teeth pass out of engagement therewith, at which time the slide is drawn back by a spiral spring, M, on the platform, ready to be again advanced by the pinion as soon as its teeth pass around to the rack again. As the slide passes out from beneath the hopper with its holes filled with corn the grains are prevented from falling out by the bottom of the depressed portion of the platform until the holes in the slide pass over holes in the said depressed portion, through which the corn drops into a spout and is conveyed to the furrow, to be covered by the shovel in the rear. As the speed of the slide in advancing will necessarily be slow by reason of the direct connection with the shaft of the drive-wheels, I arrange the machine to drop two, three, or four hills with one advance of the slide in the following manner: I make in the slide J, say, three holes side by side. I then arrange three holes, $j'$, in the depressed portion of the frame-work diagonally, so that the first hole in the slide registers with the first hole $j'$ when the slide has proceeded so far, (representing the distance between the rows,) the second hole in the slide registers with the second hole $j'$ when the slide proceeds so much farther, (representing twice the distance between the rows,) &c., the slide thus dropping three hills of corn to one revolution of the main wheel. This arrangement, it will be seen, allows a slower motion for the feed devices, and reduces the rattling and derangement of the machine. The holes in the slide J may be adjusted for any desired number of grains by gages.

The means for throwing the seeding devices into and out of gear will now be described. N N are two hand-levers, projecting through the platform upon each side of the driver's seat, which levers are pivoted to the bar B below and are held back by springs $l$. Now, when the seeding devices are not in use, the slide is forced back by its spring to its greatest limit, so that its rack is out of the range of the teeth of the pinion. To bring the rack into engagement, this is effected by one of the levers N, which, upon being thrown forward, strikes a laterally-projecting arm, O, upon the slide, and in throwing the slide forward brings its subjacent rack into engagement with the pinion. To prevent the slides in their reciprocation from passing out of the range of the pinion as soon as they are advanced by the levers N, blocks O' O' rise through slots in the frame and form an abutment in the rear of the slides, against which they strike when retracted by the springs. These blocks are attached to a cross-bar, P, and rise automatically from the action of spiral springs Q. To throw the rack away from the pinion and the feed devices out of gear, the blocks O' have to be forced down or withdrawn from the rear of the slides. To accomplish this an elbow-lever, R, is pivoted to the under side of the platform, and one arm is connected with the cross-bar P, while the other is attached to a connecting-rod, S. This connecting-rod is loosely attached at its front end to the middle of a cross-head, T. Just above the ends of the cross-head are slots $l$, which open at one end into the slots $m$, in which the levers N play in adjusting the slide. Now, by moving one of the levers N laterally from the slot $m$ to the slot $l$ and then deflecting it, it is made to strike one end of the cross-head T, and, by deflecting it, draws the connecting-rod, tilts the elbow-lever, and brings down the cross-bar P and blocks O.

By making the cross-head with two curved slots and two screws, $n\ n$, (which operate as pivots or guides, according to which end of the cross-head is deflected,) either lever is found sufficient to disconnect the seeding devices of both feed-boxes.

In constructing and arranging the tongue U, its rear end is made with a yoke, and is pivoted to projections on the frame-work. Through a slot in the same passes also a rigid curved bar, $o$, notched upon its front side. The position of the tongue is adjusted on this bar by means of a curved latch, $p$, contained in a keeper, $q$, and pivoted at one end, so as to be thrown into or out from the notches, said latch being held to its engagement with a notch by a bolt, $r$, at the opposite end from its pivot.

With respect to the feature of the segmental cog-wheel on the main shaft and the rack on the bottom of the slide, I am aware that this is not broadly new. For disengaging the said rack from the segmental pinion, as heretofore used, however, the pinion has been loose and laterally adjustable, while in my device I disconnect the seeding device by the longitudinal movement of the slide, which carries the rack out of the range of the rigid pinion on the main shaft. I therefore confine this feature of my invention to my peculiar arrangement of devices.

Having thus described my invention, what I claim as new is—

1. The levers F, provided with notched retaining-bars and rigidly connected to rock-shafts G, the rock-shafts G carrying oscillating levers H at their outer ends, and the vertically-sliding standards of the opening and covering shovels loosely connected with the opposite ends of the lever H, all combined with each other and the frame-work, substantially as shown and described.

2. A corn-planter having a feed-slide constructed with subjacent rack-bar, and combined with a segmental pinion rigidly attached to the shaft of the drive-wheels, the said slide and rack being arranged to move longitudinally out of engagement with the pinion, as and for the purpose described.

3. The combination of a reciprocating feed-slide having a subjacent rack, a segmental pinion on the drive-shaft, and a retracting-spring, the said slide and rack being arranged to move longitudinally out of engagement with the pinion, substantially as described.

4. A reciprocating feed-slide having several holes to receive the grains, arranged transversely to the line of reciprocation, in combination with a subjacent bed-piece having holes in alignment with the holes of the slide, but arranged at different distances or points along the throw of the slide, as set forth.

5. A reciprocating feed-slide held into engagement with its actuating device by an adjustable block in the rear of the slide forming an abutment, as described.

6. The platform having communicating slots $l\ n$, and the laterally-adjustable lever N, combined with the slide J, having a projecting arm, and the cross-head T, connected with the abutment-blocks O, substantially as and for the purpose described.

7. The tongue U, having a yoke-shaped rear end pivoted to the frame-work, the curved notched bar $o$ passing through a slot in the tongue, and the latch $p$, arranged to lock the tongue to the notched bar, all combined, substantially as shown and described.

The above specification of my invention signed by me this 24th day of July, 1878.

THOMAS A. SAMMONS.

Witnesses:
EDW. W. BYRN,
SOLON C. KEMON.